No. 633,071. Patented Sept. 12, 1899.
J. S. CAMPBELL.
ARTIFICIAL TOOTH.
(Application filed Oct. 15, 1895.)

(No Model.)

Witnesses.
Geo. E. Frech,
James W. Berais

Inventor.
John S. Campbell
by Pattison Nedut
Attys.

UNITED STATES PATENT OFFICE.

JOHN SMALLEY CAMPBELL, OF PARIS, FRANCE, ASSIGNOR TO THE DENTINAX (HOLDFAST-TOOTH) COMPANY, LIMITED, OF LONDON, ENGLAND.

ARTIFICIAL TOOTH.

SPECIFICATION forming part of Letters Patent No. 633,071, dated September 12, 1899.

Application filed October 15, 1895. Serial No. 565,764. (No model.)

*To all whom it may concern:*

Be it known that I, JOHN SMALLEY CAMPBELL, a citizen of the United States of America, residing at Paris, in the Republic of France, have invented Improvements in Artificial Teeth, of which the following is a specification.

This invention is for improvements in artificial teeth of the kind in which a metal plate is baked into the body of the tooth, as described and claimed in my Patent No. 465,460, dated December 22, 1891; and my present invention is designed to make the tooth much stronger, to secure the plate much more firmly in the tooth, to effect a material saving in the quantity of metal (platinum) used in the making of the tooth, and to adapt the plate for being readily held in the mold during the molding of the tooth, as well as for holding a backing to the tooth during the process of adjusting and holding the backing to the plate.

Figure 1:
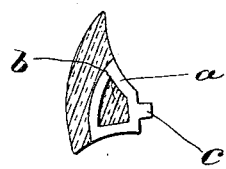
Figure 2:
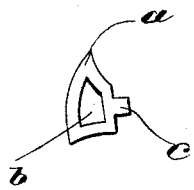
Figure 3:
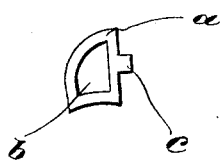

Referring to the accompanying drawings, Figure 1 shows a front tooth embodying my invention. Fig. 2 shows the perforated plate with projection or pin integral therewith. Fig. 3 shows a plate for a molar.

A thin plate or piece $a$, of suitable metal, such as platinum, is made or cut or punched externally of a form to suit the porcelain tooth it is to be used in and with. Through it a hole or window $b$ (or there may be more than one hole or window) is (or may be) at its lingual edge made or provided also with a projection $c$, which latter serves to hold the plate in the mold during the molding of the tooth and also to hold a backing to the tooth while the backing is being adjusted and soldered to the tooth. The tooth while in the plastic state is molded through the hole or holes $b$, thus tying the two sides of the tooth together and holding the plate very firmly, while saving metal and still retaining all the advantages of the metal placed edgewise, as claimed in my Patent No. 465,460, aforesaid, and when the plate is provided with the projection $c$ the backing can be used more readily, as the projection may be split, (in process of manufacture or after the tooth is made,) and after the projection has been passed through a hole in the backing one part of the split end can be turned to one side and the other part to the other side, so as to hold the backing after the manner of a paper-fastener. In some cases the projection $c$ may be dispensed with and a pin or projection made separate can be applied.

What I claim is—

1. An artificial tooth comprising a porcelain body having baked therein a vertically-arranged plate having its outer edge flush with the surface of the tooth for providing a metal surface or surfaces for soldering to, and a comparatively small outwardly-extending projection, substantially as described.

2. An artificial tooth comprising a porcelain body and a skeleton plate $a$ molded and baked therein at right angles to the back thereof with its lingual edge flush with the corresponding surface of the tooth, the lingual edge of the plate having an integral outwardly-extending projection $c$ the parts combined and arranged to operate substantially as and for the purpose described.

In testimony whereof I have signed my name to this specification in the presence of two subscribing witnesses.

JOHN SMALLEY CAMPBELL.

Witnesses:
W. LLOYD WISE,
F. J. BROUGHAM.